Nov. 7, 1967     N. H. LUTTRELL, JR     3,351,856
APPARATUS FOR DETERMINING TOTAL AMPLITUDE AND
TOTAL NUMBER OF OSCILLATIONS OF WAVES
Filed Feb. 18, 1963

INVENTOR.
NATHANIEL H. LUTTRELL, JR.

BY *Hodges*
ATTORNEY

United States Patent Office 3,351,856
Patented Nov. 7, 1967

3,351,856
APPARATUS FOR DETERMINING TOTAL AMPLITUDE AND TOTAL NUMBER OF OSCILLATIONS OF WAVES
Nathaniel H. Luttrell, Jr., Washington, D.C., assignor to the United States of America as represented by the Secretary of the Navy
Filed Feb. 18, 1963, Ser. No. 259,794
5 Claims. (Cl. 324—99)

ABSTRACT OF THE DISCLOSURE

A wave counter having a pressure transducer, servo circuitry, and two counters. A servo motor drives one counter through a ratchet to sum amplitude peaks of waves and the other counter is actuated upon change in direction of servo movement to count the number of amplitude peaks.

The invention described herein may be manufactured and used by or for the Government of the United States of America for governmental purposes without the payment of any royalties thereon or therefor.

The present invention relates to monitoring equipment and more particularly to an electromechanical circuit for monitoring and recording both the amplitude and the total number of cycles of oscillation of an electrical potential.

An object of the present invention is to monitor, measure and record accurately the sum of the amplitudes of a number of waves passing a point of reference during a predetermined time interval as well as the total number of cycles of wave oscillations presented to the apparatus of the present invention.

Another object is to provide an apparatus which will quickly and accurately follow and record an electrical potential output obtained from a transducer submerged in a body of water and subjected to varying pressures due to the presence of waves on a body of water.

Another object is to provide an apparatus which is simple, rugged, reliable, portable and capable of measuring and recording to a high degree of accuracy and resolution measurements of variations in pressure at the point of measurement.

Other objects and many of the attendant advantages of this invention will be readily appreciated as the same becomes better understood by reference to the following detailed description when considered in connection with the accompanying drawings wherein.

Figure 1:
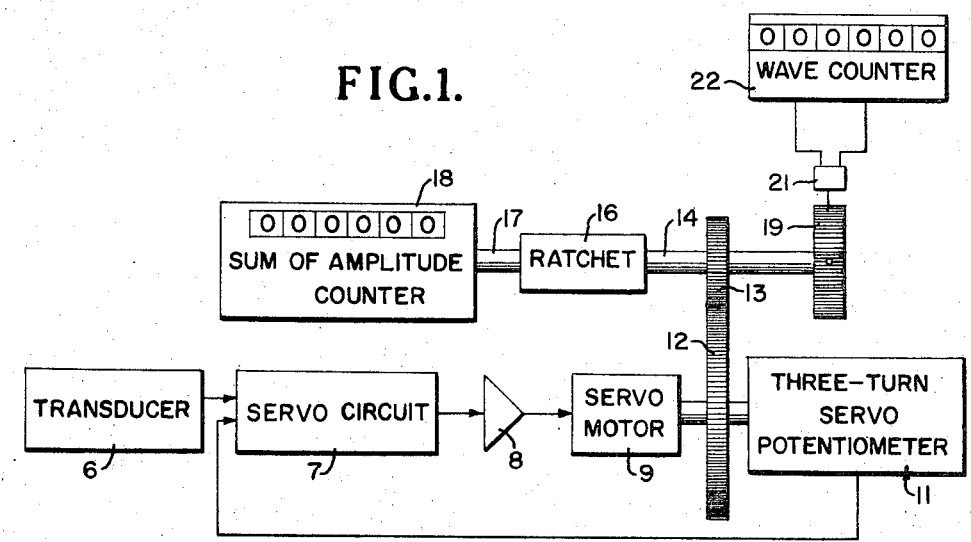
FIG. 1 illustrates a block diagram of the apparatus of the present invention.

Referring to the drawing, FIG. 1 illustrates a transducer 6 which when submerged senses changes in pressure caused by waves present on a body of water. This transducer converts the pressure into an electrical potential output, which varies directly and proportionately to the change of pressure, and has its output connected to a suitable electrical servo circuit 7. The electrical potential, FIG. 2, between point 36 and the tap 38 is compared to the potential difference between points 36 and 39. The difference of the potentials is known as the error signal, which is fed to a servo amplifier 8 to chop and amplify the input potential to produce an output potential in direct proportion to the input. The output of the servo amplifier 8 is fed directly to a servo motor 9 which converts the electrical potential input to a shaft rotation output. The shaft of the servo motor 9 is connected to a three-turn servo potentiometer 11, to complete the well known closed loop servo. Connected to the shaft of the servo motor 9 is a first gear 12 which drives a second gear 13. Attached to the second gear 13 is a shaft 14 to which a suitable ratchet or one-way clutch 16 is connected. Ratchet 16 transmits the rotational movement of shaft 14 in one direction to the shaft 17 and prevents rotation of shaft 17 in the other direction when shaft 14 is rotating in the other direction. Shaft 17 then rotates in one direction only and not in the other direction due to the action of the ratchet or unidirectional clutch 16. Attached to the shaft 17 is an amplitude counter 18 to record digitally the total decimal fractional rotations of shaft 17 in the one direction which is a summation of the amplitudes, peak-to-peak, of the electrical output of transducer 6. Also attached to the shaft 14 is a multitriangular shaped tooth gear or star gear 19 which controls the opening and closing of electrical switch 21. As the star gear 19 rotates in one direction the switch 21 is maintained in the open position and when the shaft 14 starts to rotate in the other direction the star gear 19 causes the switch 21 to close. Switch 21 controls the counting of the electrically operated wave counter 22 which increases its numerical count by one each time the switch 21 is closed.

The transducer 6 of FIG. 1 may be of the pressure responsive type such, for example, as that manufactured by the Wiancko Engineering Company of Pasadena, Calif. and known as their model number P2403. This particular transducer is a pressure responsive transducer which varies its electrical output in direct proportion to the applied pressure by varying the impedance of a reactance transformer. In the illustrative embodiment of FIG. 1, the transducer 6 is generally placed on the bottom of the body of water, such as the ocean, a few feet to several hundred feet below the surface, and is subjected to pressure differences in response to the rising and falling of the waves on the ocean. Other transducer means could be employed in contact with the water and mounted on fixed platform to thereby obtain an indication of the amplitude of the waves. The servo motor 9 can be any suitable servo motor, an example of which is the servo motor manufactured by Brown Instruments Division of Minneapolis-Honeywell Regulator Co. of Philadelphia, Pa. and known as servo motor number 702203–1 and the amplifier, known as amplifier number 359659–1, is also manufactured by Brown Instruments Division to be used as a compatible component to the above described servo motor.

Figure 2:
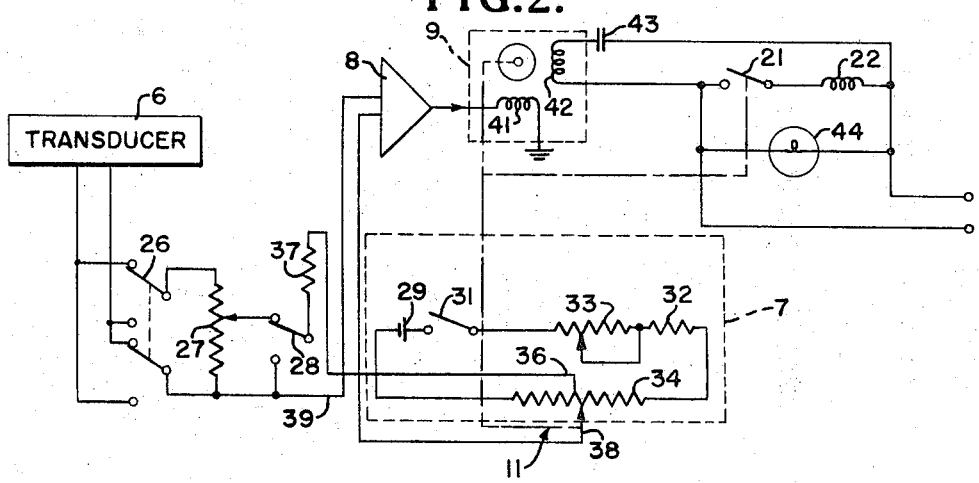
FIG. 2 is a schematic diagram partially in block diagram form, of the electrical circuitry for the apparatus of FIG. 1.

FIG. 2 illustrates an illustrative embodiment of the circuitry suitable for use with the apparatus of FIG. 1 in which the output of the transducer 6 passes through the reversing switch 26, the purpose of which is to reverse the polarity of the voltage obtained from the transducer 6 if the need arises. The electrical output potential of the transducer 6 is applied to the calibration adjustment resistor 27, the purpose of which is to obtain proper input level for the servo circuit shown generally at 7. Attached to the calibration adjustment resistor 27 and used therewith is a shorting switch 28 to provide a means for calibrating the sum of amplitude counter. The servo circuit 7 includes a power supply having a battery 29, an off-on switch 31 to eliminate excessive drain on the battery when the circuitry is not in use, a current limiting resistor 32 and a variable resistor 33 all connected in series, so the proper voltage can be applied across the potentiometer 34. The other portion of the servo circuit 7, connected in parallel with the power supply is formed by a three-turn potentiometer 11 having a moveable tap 38 in contact with the resistor 34 and having the lead 36 connected in the center thereof to fix the reference potential of the system. The moveable tap 38 is mechanically connected to the shaft output of the servo motor 9. The tap 38 together with the lead 39 from the transducer 6 detects difference in potentials caused by varying pressure on the transducer 6, which potentials are applied to the input to the servo amplifier 8. The servo amplifier 8, in a conventional manner, chops the input signal and supplies an amplifier A.C. signal, correlative thereto, to one winding 41 of the servo motor 9, thereby supplying one phase of a two phase network required to drive the servo motor 9. The other connection of the winding 41 is suitably connected to ground. A second phase applied to the other winding 42 of the servo motor 9 is produced from a conventional 115 volt, 60 cycle source. The servo motor 9 produces shaft rotation in proportion to the output of the transducer. The shaft of servo motor 9 is mechanically connected to the moveable tap 38, which forms a part of the servo circuit 7, so that the input signal received from the transducer 6 may be compared with the instant potential of tap 38 due to the position of the servo motor 9. The potential supplied to the servo amplifier 8 is the resultant of the voltage comparison caused by the instantaneous value of the pressure on the transducer and the rotational position of the servo motor 9. The voltage supplied to the servo amplifier 8 is chopped and amplified and tends to drive the servo motor 9 in a direction such that the resultant voltage supplied to the servo amplifier 8 is zero. Servo circuit 7 thereby is an accurate, reliable and sensitive means of rapidly detecting coincidence between the transducer input and the mechanical shaft position of the servo motor 9. The capacitor 43 in series with the servo motor winding 42 is a conventional capacitor as required in motors of this type. Connected in a series circuit across the conventional power supply, which may be any type suitable for the purpose, is the switch 21 and the coil 22, the switch being mechanically connected to the shaft of the servo motor 9 arranged to open in one direction and to close in the other direction of shaft rotation to control the energization of the wave counter 22 which increases its count by one on the closing of the switch 21 as described and referenced in FIG. 1. The pilot light 44 connected across the conventional power supply is utilized to indicate when power from the A.C. source is being supplied to the system.

Figure 3:
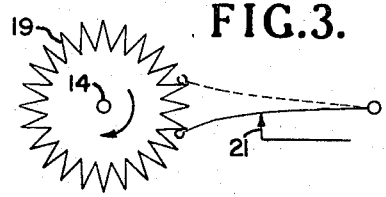
FIG. 3 is a side view of the star gear and switch mechanism.

FIG. 3 illustrates the manner of closing of switch 21 by the star gear 19 upon rotation of the shaft 14 in the direction of the arrow. The dotted outline illustrates the switch 21 in the open position when the star gear 19 is rotated in a direction opposite to the arrow.

A simple, accurate, dependable and rugged apparatus has been produced to monitor and record oscillations, both periodic and aperiodic, by obtaining a sum total of the peak-to-peak amplitude of the oscillations on one counter and recording the total number of cycles on a second counter. By operating the device for a known predetermined length of time it is possible to obtain the average height or amplitude of the waves and their frequency by dividing the sum of the amplitude counter indication by the numerical indication from the wave counter which will give the average peak-to-peak amplitude of the individual waves and by dividing the indication of the wave counter by the known elapsed time to give the frequency of the waves. Thus, a simple and accurate device for monitoring the activity of the waves on a body of water is provided which is useful in the design of certain nautical equipment as well as observing the effects of wind, tides or seiches on a fixed portion of a body of water. The invention, however, is not limited to utilization in bodies of water but can be utilized in any situation in which it is desirable to record the amplitude of electrical oscillations of low frequency whether they be periodic or aperiodic, as well as the total number of cycles of such oscillations.

Obviously many modifications and variations in the present invention are possible in the light of the above teachings and it is, therefore, to be understood that within the scope of the appended claims the invention may be practiced otherwise than as specifically described.

What is claimed is:

1. Apparatus for determining the sum of amplitudes and the total number of mechanical oscillations comprising, in combination,
    a transducer means for obtaining a continuous electrical potential output proportional to the instantaneous amplitude of the oscillations,
    a servo motor, servo circuit means connected between said transducer means and said servo motor for converting the potential output of the transducer means to mechanical shaft rotation,
    coupling means connected to the shaft of said servo motor for transmitting shaft rotation in one direction but not in the other,
    first counter means connected to said coupling means for summing the total number of shaft rotations in the one direction,
    switch means connected to the shaft of said servo motor for alternately closing an electrical circuit each time the shaft of the servo motor changes direction of rotation from the other direction to the one direction,
    and second counter means connected to said switch means for registering the total number of times said switch means closes whereby the sum of the amplitudes of the oscillations is recorded by the first counter means and the total number of oscillations is recorded by the second counter means.

2. Apparatus as recited in claim 1 wherein said servo circuit means includes
    an electrical servo circuit with an input thereto connected to an output of the transducer means and with an electrical output mechanically connected and controlled by said servo motor and having
    a power supply integral therewith for obtaining a difference potential determined by the unbalance between the input and the electrical output,
    and a servo amplifier means with an input electrically connected to the electrical output of the servo circuit and having an output connected to the servo motor for amplifying the difference potential received from the servo circuit to drive the servo motor selectively in accordance with the amplified difference potential.

3. Apparatus according to claim 2 including a calibration adjustment resistor in the input to said servo circuit and a polarity reversing switch connected in series between the output of said transducer and the calibration adjustment resistor.

4. Apparatus according to claim 2 wherein said servo motor is a two-phase motor having one winding and phase normally energized and the other winding and phase connected and energized by the output of the servo amplifier.

5. Apparatus according to claim 1 wherein said switch means comprises an electrical switch connected to and having its opening and closing controlled by a star gear connected to said motor for operation selectively in accordance with the direction of rotation of the star gear.

References Cited

UNITED STATES PATENTS 2,912,163  11/1959  Van Tuyl _____ 235—183

RUDOLPH V. ROLINEC, *Primary Examiner.*

G. L. LETT, E. F. KARLSEN, *Assistant Examiners.*